United States Patent [19]

Thigpen

[11] Patent Number: 4,566,083
[45] Date of Patent: Jan. 21, 1986

[54] SEISMIC TIMING CONTROL SYSTEM

[75] Inventor: Ben B. Thigpen, Houston, Tex.

[73] Assignee: Western Geophysical Company of America, Houston, Tex.

[21] Appl. No.: 500,922

[22] Filed: Jun. 3, 1983

[51] Int. Cl.$^4$ .............................................. G01V 1/38
[52] U.S. Cl. ........................................ 367/21; 367/23
[58] Field of Search ....................... 367/15, 16, 21, 22, 367/23, 24

[56] References Cited

U.S. PATENT DOCUMENTS

| | | | |
|---|---|---|---|
| 3,281,767 | 10/1966 | Cryar | 367/16 |
| 3,286,225 | 11/1966 | Huckabay et al. | 367/23 |
| 3,359,536 | 12/1967 | Coburn | 367/16 |
| 4,138,657 | 2/1979 | Shave | 340/3 D |
| 4,314,363 | 2/1982 | Thigpen et al. | 367/16 |

OTHER PUBLICATIONS

Bedenbender et al., "Electroacoustic Characteristics of Marine Seismic Streamers", Geophysics, vol. 35, No. 6, Dec. (1970), pp. 1054–1072.

Luehrmann, "Digital Quality Seismic Streamer System", Technical Paper, Sixth Annual Offshore Technology Conference, Houston Tex., May 6–8, (1974), pp. 789–793 and 7 pages of figures.

Primary Examiner—Salvatore Cangialosi
Assistant Examiner—K. R. Kaiser
Attorney, Agent, or Firm—William A. Knox

[57] ABSTRACT

A method for optimizing the acoustic signal-to-noise ratio during a useful maximal-length recording cycle within the time frame of a minimal-length recording episode. To implement the method, during an intermittent-tow seismic operation, the noise level due to cable manipulation during an entire recording episode is monitored. A quiet-window of a desired length is established by adjusting the length of the interval during which the seismic cable is at rest. The initiation of a recording cycle is adjusted relative to the quiet window to take maximum advantage of the quiet period.

3 Claims, 6 Drawing Figures

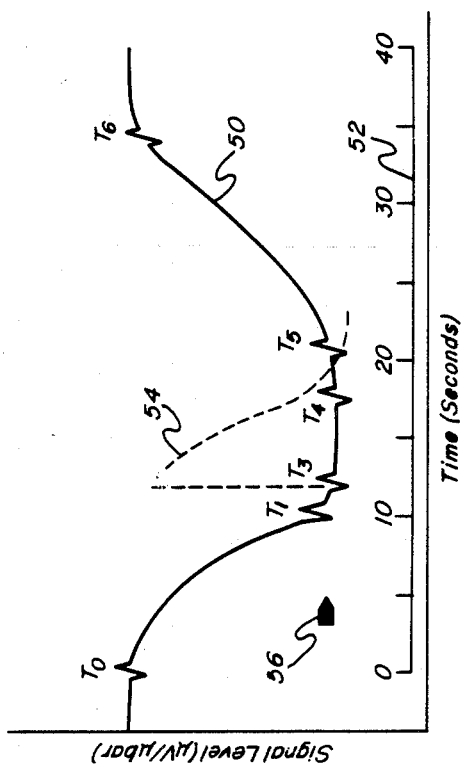
Figure 4
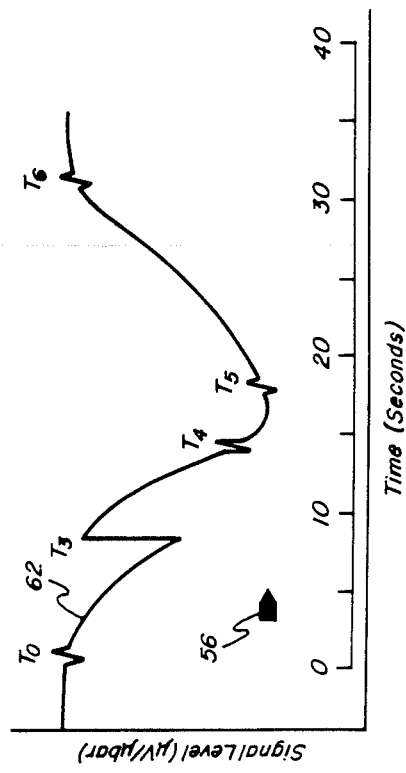
Figure 6
Figure 3
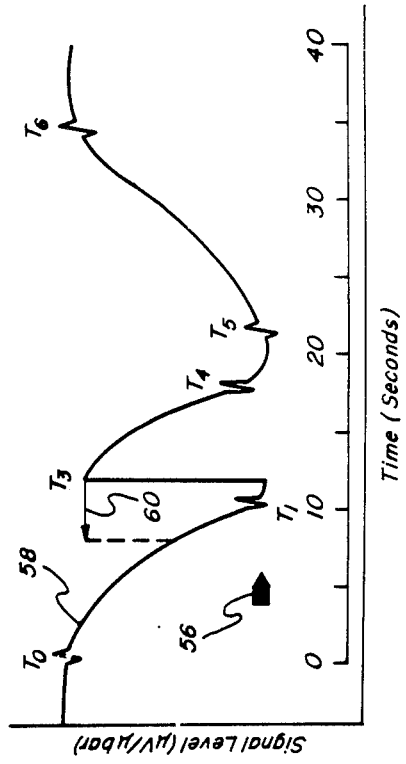
Figure 5

SEISMIC TIMING CONTROL SYSTEM

BACKGROUND OF THE INVENTION

1. Field of the Invention

This invention relates to an ambient-noise monitor and a timing control for a seismic recording system.

2. Discussion of the Prior Art

In marine seismic surveying, a ship tows through the water along a line of survey, a streamer cable containing a plurality of hydrophones and a corresponding plurality of electrical conductors. Periodically, as the ship occupies each designated recording station, a sound source is fired to generate acoustic waves. The generated acoustic waves propagate downwardly through the water and into underground rock layers. Reflected from the rock layers, the acoustic waves return to the water surface where they are detected by the hydrophones. The detected signals are transmitted to and processed by suitable recording equipment.

In relatively deep water the steamer cable is towed continuously at a desired depth, usually in the range of 20 to 40 feet. At that depth, even though the streamer cable is continuously towed at a speed of five knots or more, the towing-noise level is satisfactorily low. The streamer cable is held at a substantially constant depth by means of pressure-actuated hydrofoils or "birds". The above operational mode is defined as a continuous tow.

In very shallow water it is not practical to use the pressure-actuated hydrofoils. The streamer cable is held at a constant depth by suspending it from surface buoys or floating from a tethered weight. Under tow, the surface buoys and their associated tether lines generate an intolerable amount of noise. Accordingly when data are to be recorded by the hydrophones, the cable must lie substantially at rest. It is impractical, too time-consuming, and too uneconomical to stop the towing ship every thirty seconds or so when data are to be recorded. Hence, means are provided for first reeling in part of the cable. When a data recording is to be made, the cable is released, unreels, drifts and so becomes substantially stationary in the water while the towing ship continues on her way. At the end of the recording period, the cable is again partly reeled in and the free-wheeling cycle is repeated after the fashion of a yo-yo. This operational mode is defined as an intermittent tow.

U.S. Pat. No. 4,314,363, assigned to the assignee of this invention, discloses a complete system for operating in shallow water employing the intermittent tow mode of operation. The specification and drawings of that patent are incorporated herein by reference. There are of course some earlier primitive systems, namely U.S. Pats. No. 3,281,767 to Cryar, 3,286,225 to Huckabay et al., and 3,359,536 to Coburn. Those systems were discussed at length in the '363 reference patent.

As taught by the reference patent, the hydrophone cable is payed out for several seconds as the towing ship moves ahead. As the cable is payed out, it drifts to a standstill. A two-second delay is introduced so that the cable can settle down to provide a quiet-time window during which a recording cycle can be executed.

The timing of the sequence of events was arbitrarily chosen based upon average expected sea conditions but without regard to the actual ambient conditions existing at the time of a particular recording-cycle execution. Thus, if the recording cycle was executed too early or too late, the seismic data suffered from noise contamination. If the quiet-window period was widened to allow more leeway for executing a recording cycle, the operating efficiency of the survey crew was impaired.

SUMMARY OF THE INVENTION

It is an object of this invention to provide a method for monitoring in real time the ambient noise level during an intermittent-tow seismic survey so that each recording cycle may be initiated during the optimal portion of the actual quiet-window period.

In accordance with this invention, the RMS noise level is continuously measured and displayed as a trace on a display device during a recording episode. A steady-state quiet-window is established within the time frame of the recording episode. The start of a recording cycle is positioned relative to the quiet window in a fashion to optimize the acoustic-signal-to-noise ratio during a useful maximal-length recording cycle within the time frame of a minimal-length recording episode.

In accordance with another aspect of this invention, the sequential events during a recording episode are marked and displayed as timed pips superimposed on a trace representing the RMS signal level.

In accordance with yet another aspect of this invention, a time base is displayed.

In accordance with a further aspect of this invention, a reference cursor representative of an acceptable quiet-window noise level is superimposed on the display.

BRIEF DESCRIPTION OF THE DRAWINGS

The benefits and advantages of my invention will best be understood and appreciated by reference to the appended detailed description and the drawings, wherein:

FIG. 3 shows an apparatus useful for practicing the method of this invention;

FIG. 4 is a curve of the towing-noise level existing during a recording episode; and FIG. 5 is a curve showing the combination of towing-noise level and the acoustic signal level as a function of time; and FIG. 6 is a composite curve showing the RMS signal level as a function of time after $T_3$ has been advanced with respect to $T_0$.

DETAILED DESCRIPTION OF THE INVENTION

Figure 1:
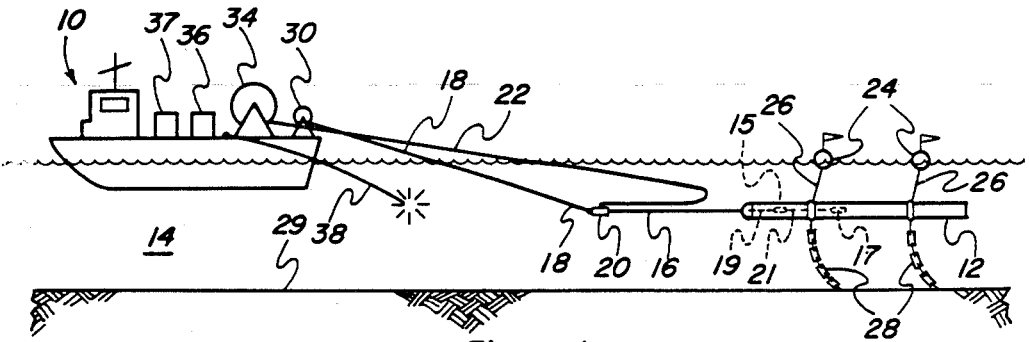
FIG. 1 shows a ship towing a seismic cable through a body of water.

By way of a brief review of the reference patent, refer now to FIG. 1 which shows a ship 10, towing a seismic streamer cable 12 through a body of water 14 by tow cable 16, and tow line 18 through towing link 20. Streamer cable 12 includes hydrophones such as 15, 17, for detecting seismic signals and electrical conductors 19, 21 for transmitting the detected signals to the ship. Tow cable 16 includes a stress member and electrical conductors for transmission of seismic signals from streamer cable 12. Tow line 18 consists only of a stress member. The electrical conductors associated with tow cable 16 are separated therefrom at towing link 20 and are separately secured to ship 10 by lead-cable 22.

A slightly negative-buoyant streamer cable 12 is maintained at a desired length by suspending it from buoys 24 on tether lines 26 for use in areas with coral or similar severe bottom conditions. Weights, in the form of short chains 28, may be attached to streamer cable 12. Especially with smooth sandy bottoms, additional fill fluid may be added to make the cable positively buoyant and chains are added to maintain the cable at a fixed height above the bottom. As shown in FIG. 1, the chains drag on the water bottom 29 and serve also to rapidly bring the cable to a standstill when tow line 18 is slacked off as will be discussed below.

Streamer cable 12 is alternately payed out and reeled in by a yo-yo reel 30 in conjunction with tow-line 18. Reel 30 may be hydraulically powered and its operation is programmed by a servo-controlled hydraulic power supply 37.

A separate cable storage reel 34 is provided. When not in service, tow cable 16 is disconnected from tow line 18. Slack-line lead-in 22, tow cable 16 and streamer cable 12 are all wound up on storage reel 34. Tow line 18 is of course, stored on yo-yo reel 30.

Seismic acoustic signals detected by the hydrophones in streamer cable 12 are transmitted by electrical conductors in streamer cable 12, tow cable 16 and slack-line lead-in cable 22 to a recording system 36. Recording system 36 receives the seismic signals, processes them and records them on an archival storage medium such as a magnetic tape.

One or more marine seismic sound sources 38 of any conventional type are towed in the water behind ship 10. The sources are fired periodically to generate acoustic waves as the ship occupies designated recording stations. The ship may be held on course and the recording stations marked by an automated navigation system (not shown). One such system is discussed in U.S. Pat. No. 4,138,657, assigned to the assignee of this invention.

As discussed earlier, it is preferable that ship 10 proceed along a designated course at constant velocity. But the noise created by the buoys 24, tether lines 26, or chains 28 is intolerable when streamer cable 12 is in motion. Accordingly, each time a seismic data recording is to be made, streamer cable 12 is decelerated substantially to a standstill by paying out two line 18 from yo-yo reel 30. At the end of a data recording cycle, tow line 18 is reeled back in.

Figure 2:
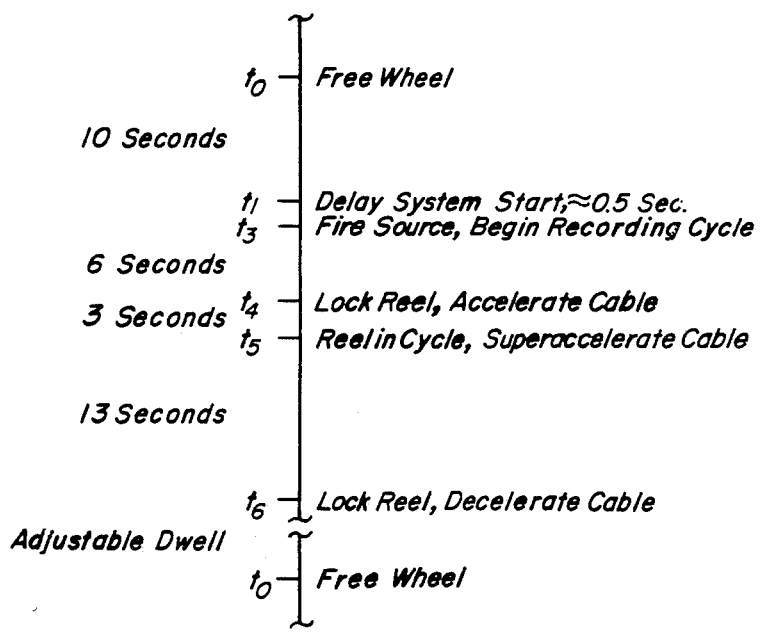
FIG. 2 is a timing diagram of the events that take place during a recording episode.

The sequence of events that occur during a complete recording episode is shown in the exemplary timing diagram of FIG. 2. At time $T_0$, reel 30 is set to free-wheel for 10 seconds. Following a further half-second stabilizing delay, at $T_3$ sound source 38 is fired and a recording cycle begins. Six seconds later at $T_4$, data recording terminates, reel 30 is locked, and the streamer cable is accelerated for about 3 seconds. At $T_5$, after the cable velocity matches ship's velocity, a reel-in cycle begins to superaccelerate the cable. At the end of 13 seconds, reel-in is complete and reel 30 is locked at time $T_6$ ready for another recording episode. It should be understood that the time sequences are exemplary only. They may be altered to fit survey requirements.

Synchronization and sequencing of the functions of cable manipulation, firing of the sound source, data recording, and the like, is conveniently accomplished by means of a microprocessor 49 (FIG. 3) of any well-known type.

The time period between $T_1$ and $T_4$ is a quiet-window period. But local environmental conditions may require more than a half-second settling time or, perhaps less settling time might be required. That is best determined from the noise monitor display, now to be described in connection with FIG. 3.

The noise monitor system consists of a selected hydrophone or hydrophone group, usually the one closest to the ship such as 15, whose output signal is fed to a fixed gain amplifier 40. Output from amplifier 40 is sent to an integrator 42 such as an RC circuit having a long time constant. The output from integrator 42, representing the RMS signal level, is displayed as a continuous noise-monitor trace on a display device 44 such as a TV display monitor which may have a refreshable screen. A time counter 46 superimposes a time scale at the bottom of the display screen. The time scale is marked in seconds and desired fractions thereof. A controller 48 which may be a part of the microprocessor, receives signals representative of the event times shown in FIG. 2, and marks them as pips on the signal-level trace. If it is a separate module, controller 48 may receive input signals from the microprocessor 49. Controller 48 synchronizes the beginning of the noise monitor trace with $T_0$. If desired, the entire duration of the recording episode, from $T_0$ to at least the beginning of $T_6$ may be displayed. At that time, the display is erased and integrator 42 is reset for the next recording episode. Alternately, the display may be retained on the screen for later reference by means of a manual blanking control.

FIG. 4 is a display of the noise level conditions that might be observed during a recording episode but without firing the sound source 38. The solid trace 50 represents the noise level amplitude in desired units such as microvolts per microbar; the respective pips $T_0$, $T_1$, etc. mark the cyclic events that occur during a recording episode. A time base 52 marked in seconds is shown below the signal level monitor trace.

As the cable is payed out at $T_0$, the cable-noise level diminishes in a predictable fashion. At time $T_1$ the recording-cycle sequence is started so that by the time the cable is stopped and actual recording starts, the signal-to-noise ratio remains tolerable throughout the recording cycle. In particular, it is a desideratum that, as the desired acoustic signal drops to its lowest level, the cable noise will similarly be minimal.

Dashed curve 54 represents the signal level due to a shot fired by source 38. The first-arriving acoustic signals may rise to a level 100 dB or more above the ambient noise level. Over a recording cycle of six seconds or so, the acoustic signal level begins to drop off and finally becomes less than the ambient steady-state noise level. At a predetermined acoustic signal level below that of the ambient noise or at a preselected time after the shot time $T_3$, no need exists to further extend the length of recording of the acoustic signal and the recording cycle is terminated. The time from the beginning of the recording cycle to the point that the acoustic signal drops to a predetermined level is the maximal useful length recording cycle.

In operation, the operator may first execute a recording episode but he does not fire the sound source 38. He may then observe the noise conditions due only to manipulation of the cable and to steady-state ambient noise in the quiet window between $T_1$ and the beginning of $T_4$ or $T_5$. If desired he may set and display an electronic cursor 56, well known to the art, on the screen to mark the level of the steady-state ambient noise to provide an example of a desired acceptable noise level for future reference. He then executes a second recording episode and this time fires source 38. The resulting display FIG. 5, of course, shows curves 50 and 54 combined into a single trace. From inspection of the position of the portion of the trace representing the level of desired acoustic signals relative to the noise level, he may decide to reduce the width of the $T_1$ interval or perhaps to eliminate it. From FIGS. 4 and 5, it may be readily appreciated that $T_3$ could be advanced by several seconds towards $T_0$, as indicated by arrow 60, because the acoustic signal level would still be nearly twice the noise level. See FIG. 6, where curve 62 is equivalent to curve 58 but with $T_3$ advanced towards $T_0$. The desired acoustic signals are readily distinguishable from the background noise. By advancing $T_3$ and reducing or eliminating the $T_1$ interval, the duration of the entire recording episode is shortened by about four seconds. Minimizing the duration of each recording episode, in this case by about one-eighth, results in an increased operating efficiency for the field crew. Thus, the operator positions the start of the recording cycle relative to the quiet-window to optimize the acoustic signal-to-noise ratio during a useful maximal-length recording cycle within the time frame of a minimal-length recording episode.

By periodically checking the noise monitor display, the operator can promptly adjust the lengths of the intervals between timing sequences of operational events to fit the ambient environmental conditions, on a current basis.

It is contemplated that the operator would manually enter the modified timing parameters into the yo-yo system controller as necessary, thereby establishing a desired quiet window during the recording episode. Usually such entries are made through a parameter-entry keyboard that is usually associated with a micoprocessor or with the automated navigation system.

Various design changes may be made in the mechanization of my invention by those skilled in the art without departing from the scope and spirit of my teachings which are limited only by the appended claims.

I claim as my invention:

1. In an intermittent-tow seismic exploration operation wherein a seismic detector cable is towed in a body of water behind a ship and is manipulated in a timed sequence of events during a recording episode, a method for initiating a recording cycle, comprising the steps of:

continuously measuring and displaying the RMS cable-noise level during a recording episode;

establishing a desired steady-state cable-noise quiet-window said recording episode;

positioning the start of a recording cycle with respect to said quiet window to optimize the acoustic signal-to-noise ratio during a useful maximal-length recording cycle within the time frame of a minimal-length recording episode.

2. The method of claim 1, further comprising the step of:

displaying a noise-level reference representative of a desired acceptable steady-state noise level, during said quiet-window concurrently with said RMS noise display.

3. The method of claim 2, further comprising the step of:

superimposing recording-episode event markers on the RMS noise display.

* * * * *